United States Patent Office

3,524,840
Patented Aug. 18, 1970

3,524,840
CATALYSTS FOR THE POLYMERIZATION OF 1,3-BUTADIENE, THEIR METHODS OF PREPARATION AND USE
Richard Rodney Durst, Stow, Ohio, assignor to The General Tire & Rubber Company, a corporation of Ohio
No Drawing. Continuation-in-part of application Ser. No. 492,307, Oct. 1, 1965. This application Sept. 11, 1968, Ser. No. 759,202
Int. Cl. C08d 3/06
U.S. Cl. 260—94.3                                10 Claims

ABSTRACT OF THE DISCLOSURE

Homogeneous catalysts of the organometallic class are prepared by mixing in specific manner a solvent, titanium tetrachloride, iodine, an organic amine and trialkyl aluminum. Polymerization of 1,3-butadiene with these catalysts yields high molecular weight polymers high in cis-1,4 content with excellent processability on both cold and hot roll mills and useful for the manufacture of automobile tires and mechanical goods and in master batching.

CROSS-REFERENCE TO RELATED APPLICATION

Reference is made under the provisions of 35 U.S.C. 120 to copending application Ser. No. 492,307, filed Oct. 1, 1965, of which the present application is a continuation-in-part now abandoned.

FIELD OF THE INVENTION

The polymerization of butadiene has been the subject of extensive research and development. This diolefin may be polymerized in a multitude of basically different ways to produce a variety of polymers ranging from low molecular weight liquid polymers through hard brittle resins to high molecular weight elastomers. The present invention concerns that field of butadiene polymerization in which high molecular weight elastomeric polymers are formed.

In the early stages of development of butadiene polymerization, the available catalysts and techniques were incapable of controlling distribution and configuration of the polymer molecules. Consequently, although the early art permitted the molecular weight of the polymers to be controlled to some extent, the molecular configuration of the polymers was not, and polymers of completely random structure were produced. More recently, techniques of butadiene polymerization have been developed using organometallic heterogeneous catalysts with the capability of producing a directive effect upon the manner in which the molecules combine in forming the polymers. Using this class of catalyst, it is now possible to control the manner of addition of molecules of the monomer to one another so as to form polymers which are prevailingly or substantially of one of several possible geometric configurations, e.g., production of polybutadiene which is essentially all cis-1,4 or trans-1,4 structure. Polybutadiene having a structure which is prevailingly cis-1,4 is of great commercial importance because it is similar in properties to natural Hevea rubber. Such cis-1,4 polybutadiene may have the nerve, elongation, tack, film forming and processability properties of natural rubber or even superior thereto. The preparation of catalysts and their use in polymerizing 1,3-butadiene into a high molecular weight polymer that is prevailingly cis-1,4 is described, for example, in U.S. Pat. 3,094,514. The catalyst used in these known polymerizations is of the organometallic heterogeneous type and contains the elements titanium, iodine and aluminum in conjunction with an organic amine. The present invention concerns organometallic type catalysts, but of a homogeneous class rather than the heterogeneous class described in U.S. 3,094,514.

With the use of this class of organometallic catalyst, it is known that polymers of varying properties may be obtained when compared as to their micro structure, macro structure, molecular weight distribution and processability. Thus, some polymers produced by this type of catalyst cannot be processed satisfactorily without blending with natural rubber. On the other hand, other polymers made with this type of catalyst while being processable without blending, yield poor physical properties in vulcanized compositions containing high contents of carbon black or oil loadings. Likewise, available polybutadienes made with this class of catalyst may tend to lose their superior mechanical properties when blended with natural rubber or butadiene-styrene elastomers, e.g., they may possess poor abrasion resistance or inferior low temperature properties. The automobile tire industry and other users of butadiene polymers have need for polybutadiene which is of improved characteristics and properties as compared with those which have been available heretofore. Specifically, a polybutadiene having all of the superior physical properties of natural rubber or synthetic rubbers previously available and which at the same time processes well without addition of other polymer would greatly increase the use of polybutadiene in the mechanical goods market and in master batching operations.

OBJECTS

A principal object of this invention is the provision of new aromatic solvent soluble polymerization catalysts capable of polymerizing 1,3-butadiene to high molecular weight prevailingly cis-1,4 polymer of superior physical properties and improved processability.

Further objects include:

(1) The provision of new methods for polymerization of 1,3-butadiene to form polybutadiene of superior mechanical properties and processability.

(2) The provision of new forms of polybutadiene which can be processed according to established rubber compounding and fabricating techniques without need to blend with other polymers and particularly useful in manufacture of mechanical goods and in master batching.

(3) The provision of new methods for making metalloorganic homogeneous catalysts from titanium tetrachloride, iodine and organic amine and trialkyl aluminum.

(4) The provision of new aromatic solvent soluble polymerization catalysts capable of polymerizing 1,3-butadiene into high molecular weight polymer that exhibits superior combinations of characteristics and properties including nerve, elongation, tack, film-forming characteristics and excellent processability on both cold and hot roll mills.

(5) The provision of new polymerization procedures to convert butadiene into rubbery polymer having very low cold-flow, good Mooney viscosity and a much higher intrinsic viscosity than cis-1,4 polymers available heretofore.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

GENERAL DESCRIPTION

These objects are accomplished according to the present invention through the discovery that a catalyst solution comprising an aromatic solvent, titanium tetrachloride, iodine, an organic amine containing only carbon, hydrogen and nitrogen atoms and a trialkyl aluminum can be created having unique properties provided the catalyst components are charged or combined in the following order:

(a) Aromatic solvent
(b) Titanium tetrachloride
(c) Iodine
(d) Organic amine
(e) Trialkyl aluminum.

Polymerization catalysts prepared by combining the ingredients in this order are unique in several respects to catalysts formed of the same ingredients but in different order of addition.

Advantageously, the new catalysts are prepared not only by combining ingredients in the specified order, but also in certain proportions. Using the titanium chloride content of the catalysts as the datum ingredient, the other components of the catalyst would be in the following ranges of moles for each mole of titanium chloride:

(a) Iodine—between 0.21 and 6.0
(b) Organic amine—between 0.23 and 5.7
(c) Trialkyl aluminum—between 1.3 and 100

Following preparation of the catalysts as indicated, polymerization of the butadiene is accomplished by contacting the monomer with the catalyst under substantially anhydrous conditions at a temperature within the range of zero to 150° C. and preferably in the range of 10 to 80° C. The proportion of catalyst to butadiene may be varied, but advantageously this ratio is held within a range which can be expressed in terms of the titanium tetrachloride content of the catalyst in moles per mole of butadiene contacted with the catalyst. The time of polymerization can be varied but advantageously is from 2 to 64 hours, the time depending primarily on the amount of catalyst charge employed, particularly in the case of batch processes.

Polymerization may be performed as a batch or continuous process. At the completion of the polymerization reaction, the resulting high molecular weight butadiene polymer is recovered by first inactivating the catalyst in the reaction mixture by adding an alcohol. Advantageously, a rubber antioxidant is added to the reaction mixture prior to isolation of the polymer in order to prevent oxidation of the rubbery polymer. Polymer recovery can be accomplished by removing the hydrocarbon solvent by steam-stripping, azeotropic distillation or vacuum distillation. This is followed by drying of the polymer at elevated temperature, e.g., 50° C., preferably in a vacuum oven until a constant weight is obtained indicating removal of all volatile components.

The rubbery polymers which result when 1,3-butadiene is polymerized in accordance with this invention can be readily compounded by any of the known methods used by the rubber industry for compounding natural and synthetic rubber. For example, in producing vulcanizable compositions, the normal accelerators, sulfur, reinforcing agents, plasticizers and fillers can be compounded with the polymer. The new rubbery polybutadienes produced by the invention exhibit excellent nerve, gum strength, film-forming characteristics, very low cold flow and excellent processing qualities on both cold and hot roll mills. These polybutadienes have gel contents ranging from zero to over 50% and swell indexes ranging from 100 to over 200, this latter characteristic depending to some extent upon the ratio of iodine to titanium tetrachloride in the catalyst used. The polymers also have a micro structure of 4 to 20% trans-1,4; 8 to 20% cis-1,2 and 60 to 88% cis-1,4 isomer, these percentages depending to some extent upon the mole ratio of amine and iodine to titanium tetrachloride contained in the catalyst. Further, the new polymers have a Mooney ML-4 viscosity comparable to commercially available cis-1,4 polybutadiene and a much higher intrinsic viscosity than such polymers.

DISCUSSION OF DETAILS

The trialkyl aluminum employed in the new catalyst system with the titanium tetrachloride-iodine-amine complex can be represented by the formula $R_3Al$, wherein R is an alkyl radical containing up to and including 8 carbon atoms. The alkyl groups can be either straight or branched-chain alkyls, for example, ethyl, propyl, isopropyl, n-butyl, isobutyl, pentyl, isohexyl, n-hexyl or octyl. The preferred trialkyl aluminum is triethyl-aluminum (TEA) or trisobutyl aluminum (TBA).

Mixtures of trialkyl aluminum may be used in the new catalyst systems. The amount of trialkyl aluminum used is advantageously in the range of 1.25 to 100 moles per mole of titanium tetrachloride. A preferred ratio is from 1.5 to 35 moles of trialkyl aluminum per mole of titanium tetrachloride with the optimum mole ratio at 15 to 16.

A second essential ingredient of the new catalysts is an organic amine which contains only carbon, hydrogen and nitrogen atoms. In this class, one may use any primary, secondary, tertiary, and cyclic amines, e.g., phenyl-beta-napthylamine, cyclohexylamine, isopropylamine, pyridine, triethylamine, n-, sec-, tert-butylamine, aniline, benzylamine, diphenylamine, diamylamine, dibutylamine, dicyclohexylamine, diethylamine, etc., in conjunction with the $TTC-I_2$ and $R_3Al$ to produce the new, excellent processable polybutadiene. The amine compounds may contain more than one amine group, that is, they may be diamines, triamines, etc. Advantageously, the amine will contain 2–26 carbon atoms. Alkyl amines of 2 to 12 carbon atoms produce excellent catalysts.

The amount of amine used in the catalyst composition of this invention is usually in the range of 0.225 to 5.65 moles per mole of titanium tetrachloride with a preferred ratio of 1.85 to 2.43 moles of amine per mole of titanium tetrachloride.

The amount of iodine used in the catalyst composition of the invention is usually in the range of 0.209 to 6.0 moles per mole of titanium tetrachloride with a preferred ratio of 4 to 6 moles of iodine per mole of titanium tetrachloride.

Solvents suitable for use in the polymerization process are aromatic hydrocarbons which do not contain materials known to be destructive to the catalyst composition of the invention. Such deleterious materials include carbon dioxide, oxygen, alcohols, ethers, water, acetylenic compounds and active hydrogen compounds. It is highly desirable, therefore, that the aromatic hydrocarbon solvent as well as the 1,3-butadiene be freed of these materials which tend to inactivate the catalyst. Any of the known means for removing such contaminants can be used, e.g., passing the solvent or 1,3-butadiene over silica gel, aluminum oxide, distillation from an aluminum alkyl, or passing over a bed of suitable Linde molecular sieves which have been previously heated to 300° C. for 16 hours under a flow of lamp grade nitrogen. Suitable solvents (which are solvents for the catalyst as well as the polymer) include aromatics, e.g., benzene, toluene, xylene, ethylbenzene and mixtures of each. Paraffinic hydrocarbons can also be used as diluents when mixed with the aromatics up to 50% by volume of the solvent-diluent mix, preferably less than about 25% of the diluent-solvent mix. It is preferable to use monocyclic aryl hydrocarbons, and, particularly, toluene.

The amount of titanium tetrachloride used in the catalyst composition is usually in the range of $1.39 \times 10^{-4}$ moles to $4.1 \times 10^{-4}$ moles per mole of charged 1,3-butadiene with a preferred quantity of 1.65×10⁻⁴ moles per mole of 1,3-butadiene charged to the polmerization reactor.

The polymerization method of this invention can be performed at any temperature within the range of zero to 150° C., but it is preferred to operate in the range of 10 to 80° C.

The process of this invention can be performed as a batch or continuous process; however, as previously stated, it is critical that the order of addition of the reactants must be followed. The type of apparatus used to prepare the new catalyst and polymers is not critical. Any forms of equipment known to the art to be useful in preparing diolefin polymers with organometallic catalysts may be employed. Polymerization should be conducted under substantially anhydrous, oxygen-free conditions.

EXAMPLES

A more complete understanding of the new methods and products of the invention may be had by reference to the following working examples of actual operations performed in accordance with the invention. In these examples and throughout the remaining specification and claims, all parts and percentages are by weight unless otherwise specified.

Example I

A series of polymerizations was made in which 1,3-butadiene was polymerized to a rubbery polymer employing a catalyst system comprising TTC-I₂-pyridine-TBA. These runs were carried out by the following procedure.

Toluene (dried over conditioned Linde 4A molecular sieves) was charged to a nitrogen-flushed one-quart bottle, after which an amount of TTC (in n-heptane), iodine (in benzene), pyridine (in benzene), and TBA (in benzene) solutions were charged into the capped bottle through the punched crown cap, lined with a butyl gasket and Teflon disc, by means of a syringe. The 1,3-butadiene was then charged into the bottle containing the catalyst complex in the solution by insertion (through the cap of the bottle) of a hypodermic needle which attached to a valved stainless steel bomb. The 1,3-butadiene was charged by weight difference.

The bottle, after placing in a stainless steel safety container, was then rotated in water baths at various temperatures for various periods of time. At the end of this time, the bottle was removed, and after releasing any pressure in the bottle, 100 milliliters of isopropanol were mixed with the solution of polymer until all of the catalyst was destroyed. A benzene solution of phenyl-beta-naphthyl-amine (one weight percent based on charged 1,3-butadiene) was then mixed with the solution of polymer before steam-stripping the solvent. The wet polymer was dried in a vacuum oven at 50° C. until a constant weight was obtained. The polymer from each of these runs was then weighed to determine the yield, after which the polymer from each run was tested for Mooney ML–4 viscosity, intrinsic viscosity, gel content, microstructure, and processability on a cold and 200° F. two-roll mill.

The results of these polymerizations are presented in Table I.

TABLE I

| Run No. 9370-VII | TTC Parts by weight | TTC Mmoles | I₂/TTC, mole ratio | PY/TTC, mole ratio | TBA/TTC, mole ratio | Temp. ° C. | Time, hrs. | Conv. percent |
|---|---|---|---|---|---|---|---|---|
| 31C | .0655 | .346 | .21 | -------- | 10.9 | 50 | 18 | 9 |
| 31D | .0655 | .346 | .21 | 2.15 | 10.9 | 50 | 18 | 10 |
| 32A | .655 | .346 | .21 | -------- | 10.9 | 80 | 16 | 20 |
| 32B | .655 | .346 | .21 | 2.15 | 10.9 | 80 | 16 | 20 |
| 32C | .0655 | .346 | .21 | 2.15 | 10.9 | 80 | 16 | 28 |
| 32D | .0752 | .398 | .195 | 2.15 | 10.9 | 80 | 16 | 20 |
| 32E | .097 | .513 | .193 | 2.18 | 10.9 | 80 | 16 | 22 |
| 33A | .0655 | .346 | .21 | 2.15 | 10.9 | 80 | 18 | 23 |
| 33B | .0655 | .346 | .21 | 2.15 | 10.9 | 80 | 18 | 21 |
| 34A | .0766 | .406 | 5.95 | 1.86 | 12.1 | 80 | 18 | 100 |
| 34B | .0766 | .406 | 5.95 | 1.86 | 6.55 | 80 | 18 | 87 |
| 34C | .0766 | .406 | 4.0 | 1.86 | 12. | 80 | 18 | 89 |
| 34D | .0766 | .406 | 5.95 | 2.48 | 12. | 80 | 18 | 98 |
| 35A | .0766 | .406 | 4.0 | 2.48 | 12. | 80 | 17 | 81 |
| 35B | .0766 | .406 | 3.6 | 1.86 | 12. | 80 | 17 | 77 |
| 35C | .0766 | .406 | 3.2 | 1.86 | 12. | 80 | 17 | 69 |
| 35D | .0766 | .406 | 2.8 | 1.86 | 12. | 80 | 17 | 57 |
| 36C | .0766 | .406 | 2.7 | 1.86 | 12. | 80 | 5 | 32 |
| 36D | .0766 | .406 | 2.7 | 1.86 | 12. | 80 | 5 | 33 |
| 38D | .0766 | .406 | 4.0 | 1.86 | 12. | 60 | 16 | 72 |

| Run No. 9370-VII | Mooney ML-4 | [η],[1] dl/g. | Gel, percent | Swell index | Microstructure Trans, percent | Microstructure 1, 2, percent | Microstructure Cis, percent [2] | Processability [3] |
|---|---|---|---|---|---|---|---|---|
| 31C | | 2.80 | 29 | 30 | 19 | 19 | 62 | Good. |
| 31D | | 3.02 | 38 | 41 | 18 | 17 | 65 | Do. |
| 32A | | 1.85 | 20 | 69 | 22 | 22 | 56 | Do. |
| 32B | | 2.53 | 14 | 94 | 22 | 21 | 57 | Do. |
| 32C | | 2.64 | 37 | 85 | 18 | 22 | 60 | Do. |
| 32D | | 2.53 | 24 | 94 | 19 | 23 | 58 | Do. |
| 32E | | 2.39 | 22 | 94 | 27 | 22 | 50 | Do. |
| 33A | | 2.66 | 34 | 107 | 17 | 21 | 62 | Do. |
| 33B | | 3.27 | 28 | 113 | 19 | 21 | 60 | Do. |
| 34A | | 1.10 | 0 | 0 | 17 | 7 | 76 | Fair. |
| 34B | 22 | 1.62 | 1 | 64 | 22 | 5 | 73 | Do. |
| 34C | | 1.65 | 0 | 0 | 16 | 9 | 75 | Do. |
| 34D | 26 | 1.62 | 0 | 0 | 14 | 7 | 79 | Do. |
| 35A | 16 | 2.35 | 15 | 142 | 15 | 10 | 75 | Good. |
| 35B | 9 | 1.95 | 16 | 129 | 15 | 10 | 75 | Do. |
| 35C | 17 | 2.40 | 15 | 207 | 15 | 11 | 74 | Do. |
| 35D | 21 | 2.81 | 21 | 136 | 16 | 13 | 71 | Excellent. |
| 36C | 15 | 2.46 | 22 | 134 | 18 | 15 | 67 | Good. |
| 36D | 19 | 2.79 | 28 | 143 | 17 | 14 | 69 | Do. |
| 38D | 25 | 2.68 | 14 | 178 | 10 | 10 | 80 | Excellent. |

[1] Measured in benzene at 25° C.
[2] Measured by difference.
[3] Processability was based on the ability of the polymer to band on a 3″ x 6″ two-roll mill heated to 200° F. The degree of processability is expressed in the following manner: poor —partial banding, no rolling bank; fair—banded, poor rolling bank; good —rolling bank; excellent —smooth rolling bank.

Polymerizations performed as described above used the following polymerization recipe:

Polymerization recipe I

| Reagents: | Parts by weight |
|---|---|
| Toluene | 433 (500 ml.). |
| Titanium tetrachloride (TTC) [1] | Variable. |
| Iodine (I$_2$) [2] | Variable. |
| Pyridine (Py) [3] | Variable. |
| Triisobutyl aluminum (TBA) [4] | Variable. |
| Butadiene | 100. |
| TBA/TTC mole ratio | Variable. |
| Temperature, °C. | Variable. |
| Time, hours | Variable. |

[1] The concentration of a n-heptane solution of TTC was 0.04861 gms. TTC/ml. of solution or 0.2567 mmoles TTC/ml. solution.
[2] The concentration of a benzene solution of iodine was 0.02 gms. I$_2$/ml. solution or 0.158 mmoles I$_2$/ml. solution.
[3] The concentration of a benzene solution of pyridine was 0.0196 gms. Py/ml. solution or 0.248 mmoles Py/ml. solution.
[4] The concentration of a benezene solution of TBA was 0.1292 gms. TBA/ml. of solution or 0.6514 mmoles.

Example II

A series of polymerizations was made in which 1,3-butadiene was polymerized to rubbery polymer employing a catalyst system consisting of a solution of titanium tetrachloride, iodine, triethylamine, and triisobutyl aluminum. The procedure by which these runs were done is similar to that used in Example I. The runs were made using the following polymerization recipe:

Polymerization recipe II

| Reactants: | Parts by weight |
|---|---|
| Toluene | 433 (500 mls.). |
| Titanium tetrahcloride (TTC) | Variable. |
| Iodine (I$_2$) | Variable. |
| Triethylamine (TEA) [1] | Variable. |
| Triisobutyl aluminum (TBA) | Variable. |
| Butadiene | 100. |
| TBA/TTC mole ratio | Variable. |
| Temperature, °C. | Variable. |
| Time, hours | Variable. |

[1] The concentration of a benzene solution of TEA was 0.0183 gms./ml. solution or 0.181 mmoles TEA/ml. solution. The results of some of these runs are presented in Table II.

The microstructure of the polybutadiene rubbers as reported in Table II were determined by infra red analysis. Such determination of the percentage of polymer formed as cis-1,4 addition, trans-1,4 addition and 1,2 addition of the butadiene was performed by dissolving the polymer in carbon disulfide to form a solution having 20 grams of polymer per liter of solution. The infra red spectrum of each of the solutions (percent transmission) was then determined in a Perkin-Elmer Infra red Spectrophotometer Model 21. The percent of the total unsaturation present as trans-1,4 was calculated according to the equation $e = E/tc$ in which:

$e$ = extinction coefficient
$E$ = extinction (log $I_0/I$)
$t$ = path length in microns
$c$ = concentration in moles double bond per liter.

The extinction was determined at the 10.35 micro band and the extinction coefficient used was 0.00121.

The percent of total unsaturation present as 1,2-vinyl was calculated according to the above equation, using the 11.0 micro band and an extinction coefficient of 0.00152.

The percent of total unsaturation present as cis-1,4 was obtained by subtracting the trans-1,4 and 1,2-vinyl determined according to the described methods from the theoretical unsaturation assuming one double bond per butadiene unit in the polymer.

Example III

One of the major problems existing with the high cis polybutadiene rubbers has been their tendency to cold-flow on standing. Several of the polybutadiene rubbers prepared by the TTC-I$_2$-TEA-TBA catalyst system of this invention were compared with a commercially available polybutadiene having a high cis-1,4 content for

| Run No. 9370-VII | TTC Parts by wt. | TTC Mmoles | I$_2$/TTC, mole ratio | TEA/TTC, mole ratio | TBA/TTC, mole ratio | Temp. °C. | Time hrs. | Conv. percent |
|---|---|---|---|---|---|---|---|---|
| 39A | .0766 | .406 | 4 | 1.86 | 12 | 60 | 16 | 86 |
| 39B | .0766 | .406 | 4 | 2.48 | 12 | 60 | 16 | 70 |
| 39C | .0766 | .406 | 4 | 1.86 | 12 | 60 | 5 | 47 |
| 39D | .0766 | .406 | 4 | 2.48 | 12 | 60 | 5 | 57 |
| 40B | .0766 | .406 | 4 | 2.48 | 12 | 30 | 22 | 33 |
| 42B | .0766 | .406 | 4 | 1.86 | 12 | 60 | 17 | 88 |
| 49A | .0582 | .306 | 5.23 | 2.43 | 15.8 | 50 | 16 | 76 |
| 49B | .0582 | .306 | 5.23 | 2.43 | 15.8 | 50 | 16 | 65 |
| 49C | .0582 | .306 | 5.23 | 2.43 | 15.8 | 50 | 16 | 71 |
| 53C | .0582 | .306 | 5.95 | 1.86 | 12 | 50 | 18 | 91 |
| 55B | .0486 | .257 | 6.00 | 1.86 | 12 | 50 | 66 | 97 |
| 55C | .0486 | .257 | 6.00 |  | 12 | 50 | 66 | 97 |
| 100A | .0582 | .306 | 5.7 | 2.43 | 15.8 | 50 | 16 | 86 |
| 50A [1] | .03 | .159 | 5.02 | 2.31 | 15.2 | 50 | 16 | 52 |
| 91C [1] | .0291 | .153 | 5.22 | 2.43 | 15.8 | 50 | 18 | 66 |
| 92C [1] | .0291 | .153 | 5.68 | 2.43 | 15.8 | 50 | 19 | 48 |

| Run No. 9370-VII | Mooney ML-4 | [η] dl./g. | Gel percent | Swell Index | Microstructure [2] Trans, percent | 1,2, percent | Cis, percent | Processability |
|---|---|---|---|---|---|---|---|---|
| 39A | 46 | 2.98 | 27 | 177 | 8 | 11 | 81 | Excellent. |
| 39B | 12 | 2.00 | 29 | 113 | 10 | 9 | 81 | Good. |
| 39C | 22 | 2.60 | 25 | 179 | 8 | 10 | 82 | Excellent. |
| 39D | 40 | 3.00 | 60 | 86 | 5 | 11 | 84 | Do. |
| 40B | 15 | 1.83 | 27 | 120 | 8 | 8 | 84 | Good. |
| 42B | 51 | 2.08 | 44 | 91 | 8 | 10 | 82 | Excellent. |
| 49A | 53 | 4.31 | 46 | 113 | 4 | 14 | 82 | Do. |
| 49B | 46 | 5.25 | 23 | 113 | 4 | 13 | 83 | Do. |
| 49C | 59 | 4.98 | 40 | 104 | 3 | 12 | 85 | Do. |
| 53C | 25 | 2.20 | 10 | 183 | 5 | 10 | 85 | Do. |
| 55B | 59 | 2.59 | 0 | 0 | 6 | 6 | 88 | Fair. |
| 55C | 27 | 1.92 | 0 | 0 | 7 | 5 | 88 | Do. |
| 100A | 43 | 2.05 | 46 | 86 |  |  |  | Excellent. |
| 50A [1] | 34 | 2.80 | 49 | 130 | 4 | 10 | 86 | Do. |
| 91C [1] | 45 | 3.06 | 41 | 143 |  |  |  | Do. |
| 92C [1] | 41 | 3.06 | 19 | 138 |  |  |  | Do. |

[1] The charge of butadiene was 50 grams.
[2] The microstructure II of the polybutadiene rubbers were determined as described in Example VIII of Disclosure PDCR-1120.

their tendency to cold-flow. The results of the cold-flow measurements are presented in Table III.

TABLE III

| Polybutadiene | Catalyst | PZN. temp.,°C. | Mooney ML-4 | $(\eta)$, dl/g. | Gel., percent | Swell index | Microstructure | | | Mg. of rubber extruded per min. |
|---|---|---|---|---|---|---|---|---|---|---|
| | | | | | | | Cis, percent | Trans, percent | 1,2, percent | |
| Commercial polymer | TBA-I₂-TTC | 10-25 | 46 | 2.58 | 0 | 0 | 94 | 2 | 4 | 1.02 |
| 9370-VII-39C | TTC-I₂-TEA-TBA | 60 | 22 | 2.60 | 25 | 179 | 82 | 8 | 10 | .126 |
| 55B | TTC-I₂-TEA-TBA | 50 | 59 | 2.59 | 0 | 0 | 88 | 6 | 6 | 0. |

Example IV

A pair of polymerizations were performed in which 1,3-butadiene was polymerized to rubbery polymer. The procedure used was similar to that described in Example I using catalysts formed of the following components mixed in the order listed and in the parts stated:

| Component | Catalyst A | Catalyst B |
|---|---|---|
| Toluene (dried), gms | 434 | 434 |
| Titanium tetrachloride, mmoles | .346 | .346 |
| Iodine, mmoles | .0725 | .0725 |
| Pyridine, mmoles | | .744 |
| Triisobutyl aluminum, mmoles | 3.77 | 3.77 |

Upon addition of the TiCl₄ in both A and B, a yellow solution was formed. Addition of the iodine in both cases produced an orange-red clear solution. Addition of the pyridine in B turned the solution cloudy. On addition of the TBA in A changed the solution to a brown color and on standing a precipitate was formed. In the case B, a dark brown solution was formed on addition of the TBA and the solution remained homogeneous on standing.

To each of these catalysts there was added 100 parts of 1,3-butadiene giving a mmole ratio of TiCl₄ to charged diolefin of 0.346. In each case the polymerization was continued at 50° C. for 18 hours. The resulting polymers had the following properties:

| Property | Catalyst A | Catalyst B |
|---|---|---|
| Intrinsic viscosity | 2.80 | 3.02 |
| Gel, percent | 29.5 | 37.7 |
| Swelling index | 30.7 | 41.3 |
| Percent trans polymer | 19.6 | 17.5 |
| 1,2-polymer, percent | 18.9 | 17.4 |
| 1,4-cis, percent | 61.5 | 65.1 |

In another case, a combination of styrene and butadiene in a parts ratio of 16:100 was polymerized using a mmole ratio of TTC to butadiene of 0.153 and gave a polymer of intrinsic viscosity of 3.15, a gel % of 47.5 and a swelling index of 114.

SUMMARY

The invention as described above provides new forms of metallo-organic homogeneous solvent soluble catalysts resulting from the discovery that such catalysts can be obtained by using a specific order of adding and combining catalyst components in such polymerization reactions and in using certain specific proportions of components in forming the catalyst systems.

The embodiments of the invention in which an exclusive property or privilege is claimed are defined as follows:

1. The method of polymerizing 1,3-butadiene into prevailingly cis-1,4 polymer having excellent processability on both cold and hot roll mills which comprises:
   (A) providing the following ingredients:
      (a) aromatic hydrocarbon liquid,
      (b) titanium tetrachloride,
      (c) iodine,
      (d) organic amine containing only carbon, hydrogen and nitrogen atoms and containing 2 to 26 carbon atoms,
      (e) trialkyl aluminum of 3 to 24 carbon atoms,
   (B) charging said ingredients in the order above listed into a vessel in proportions within the limits fixed by the following molar ratios:

$c:b$ = between 0.21:1 and 6.0:1
   $d:b$ = between 0.23:1 and 5.7:1
   $e:b$ = between 1.3:1 and 100:1

(C) mixing said ingredients together after contact in said order under substantially anhydrous conditions to produce a homogeneous solution,
   (D) contacting 1,3-butadiene with the resulting homogeneous solution under substantially anhydrous conditions at a temperature between 0 to 150° C. and a pressure between 10 to 1000 p.s.i.g., the proportion of 1,3-butadiene to homogeneous solution being such that the amount of titanium tetrachloride present in the solution used is in the range of $1.39 \times 10^{-4}$ to $4.1 \times 10^{-4}$ moles per mole of charged 1,3-butadiene, and
   (E) recovering high molecular weight polybutadiene from the reaction mixture.

2. The method of claim 1 wherein said temperature of step D is 10 to 80° C.

3. The method of claim 1 wherein said aromatic hydrocarbon liquid is benzene, toluene, xylene or ethyl benzene.

4. The method of claim 1 wherein said organic amine is an amine of 2 to 12 carbon atoms.

5. The method of claim 4 wherein the mole ratio of amine to titanium tetrachloride is between 1.85:1 and 2.43:1.

6. The method of claim 5 wherein the mole ratio of iodine to titanium tetrachloride is between 4:1 and 6:1.

7. The method of claim 1 wherein said aromatic hydrocarbon liquid is a mixture of at least 50% monocyclic aromatic hydrocarbon and up to 50% of liquid aliphatic hydrocarbon.

8. A homogeneous catalyst for use in polymerization of unsaturated hydrocarbon consisting essentially of the following ingredients dissolved in aromatic hydrocarbon liquid:
   (A) titanium tetrachloride,
   (B) iodine,
   (C) organic amine containing only carbon, hydrocarbon and nitrogen atoms and containing 2 to 26 carbon atoms,
   (D) trialkyl aluminum of 3 to 24 carbon atoms,
   said solution containing said ingredients in the following molar ratios:

$B:A$ = between 0.21:1 and 6.0:1
   $C:A$ = between 0.23:1 and 5.7:1
   $D:A$ = between 1.3:1 and 100:1 said solution resulting from the addition of said ingredients to said aromatic hydrocarbon liquid in the order above listed under substantially anhydrous conditions.

9. A homogeneous catalyst as claimed in claim 8 wherein said aromatic hydrocarbon liquid comprises at least 50% of benzene, toluene, xylene or ethyl benzene.

10. A homogeneous catalyst as claimed in claim 8 wherein said organic amine is pyridine and the trialkyl aluminum is triisobutyl aluminum.

References Cited

UNITED STATES PATENTS

| | | | |
|---|---|---|---|
| 3,116,274 | 12/1963 | Boehm et al. | 260—94.9 |
| 3,139,418 | 6/1964 | Marullo et al. | 260—93.7 |
| 3,205,213 | 9/1965 | Stearns et al. | 260—94.3 |

JOSEPH L. SCHOFER, Primary Examiner

R. A. GAITHER, Assistant Examiner

U.S. Cl. X.R.

252—429